United States Patent [19]

Cantrell

[11] Patent Number: 5,368,396
[45] Date of Patent: Nov. 29, 1994

[54] ROLLER AND TRACK ARRANGEMENT FOR SLIDING MEMBERS, AND STRUCTURES EMBODYING SUCH ARANGEMENTS

[76] Inventor: Dan R. Cantrell, 2006 Brentwood Ter., Nashville, Tenn. 37211

[21] Appl. No.: 164,459

[22] Filed: Dec. 9, 1993

Related U.S. Application Data

[63] Continuation-in-part of Ser. No. 834,768, Feb. 12, 1992, abandoned.

[51] Int. Cl.$^5$ .................. F16C 29/04; F16C 29/08
[52] U.S. Cl. ............................... 384/58; 16/98; 384/15; 384/53
[58] Field of Search ............ 384/7, 8, 15, 50, 52, 384/53, 55, 58, 449; 16/87 R, 87 B-87.8, 88, 97, 98, 100, 106, 107

[56] References Cited

U.S. PATENT DOCUMENTS

| | | | |
|---|---|---|---|
| 895,794 | 8/1908 | Russell | 16/98 |
| 962,538 | 6/1910 | Wagner | 16/98 |
| 2,185,304 | 1/1940 | Knapp | 384/53 |
| 2,207,322 | 7/1940 | Long | 16/87 R |
| 4,376,543 | 3/1983 | Sakagami | 384/15 X |

*Primary Examiner*—Thomas R. Hannon

[57] ABSTRACT

A roller and track arrangement for sliding members, has an elongate track with one or more slots extending into the track. Each slot has a first position at its outer end and an enlarged portion toward its inner end. Support members extend into the slot or slots. Rollers on the support members are positioned in the enlarged portions. The enlarged portions can be circular in cross-section with ovoid rollers. The enlarged portions can also be elongate in cross-section. The rollers can then be spherical. A particular use is for telescopic sliding roof sections for an open back truck. Tracks are mounted on the top edges of the truck side walls. The roof sections extend into the slots and carry the rollers. Seals for the slots and between ends of the roof sections can be provided.

19 Claims, 7 Drawing Sheets

ROLLER AND TRACK ARRANGEMENT FOR SLIDING MEMBERS, AND STRUCTURES EMBODYING SUCH ARANGEMENTS

This application is a continuation in part of application Ser. No. 834 768 filed Dec. 2, 1992 now abandoned.

This invention relates to roller and track arrangements for sliding members. Particularly, but not exclusively, the invention relates to such arrangements for structures, such as for example, telescopic roof structures.

Many proposals and structures exist for telescopic roof structures, particularly for the covering of open truck bodies. Generally such roof structures comprise a series of sections that slide along the truck body and nest one within another. The sections may nest at either end of the body. In one arrangement the section closest to the driver's cab of the truck has the largest cross-section, with successive sections of successively decreasing cross section. In an alternative arrangement, the section with the smallest cross-section is closest to the cab, with successive sections of necessarily increasing cross-section.

It is desirable that when a roof structure is closed, that is, in the extended condition over an enclosed space, then it should be weather proof, not leaking water. The roof structure, whether on a truck body or covering some other enclosed area, is subject to the effects of the weather and other environmental problems, such as snow and ice, rain, dust and the like. Other forms of sliding structure exist and the invention is readily applicable to such other forms.

It is desirable that there is ease of movement, and in many cases maximum protection against the weather and other problems.

The present invention provides a support and guidance roller and track assembly which both supports and guides sliding members. In a particular example, for a roof structure having segments which are of arched form, with downward projecting side walls or legs at each side, a plurality of roller bearing assemblies are positioned along the lower edges of each side wall of each section. The bearing assemblies run in a contoured track. The track structures are, for example, positioned along the sides of an enclosure to be covered, or attached to a truck body. Flexible magnetic sealing members can be positioned on the truck members to seal off access to the bearing assemblies. Flexible magnetic sealing members can also be provided at ends of sliding members to seal the structure when the members are extended, for example, to close over an enclosure.

The invention will be readily understood by the following description of certain embodiments as applied to a truck body, by way of example, in conjunction with the accompanying drawings, in which:

FIGS. 1 to 5 illustrate an open back truck, to which the invention has been applied, as an example of a use of the invention.

Illustrated in FIGS. 1, 2, 3 and 4 is an open back truck 10—often referred to as a pick-up truck, in which the rear, load carrying, portion 12 is covered by a telescopic roof structure indicated generally at 14. In the example the roof structure comprises a fixed portion channel shaped 16, at the forward end of the portion 12, and four telescopic channel shaped sections 18. The portions 18 slide towards the front of the truck, with the sections sliding one under another, finally sliding under the fixed portion 16.

Figure 1:
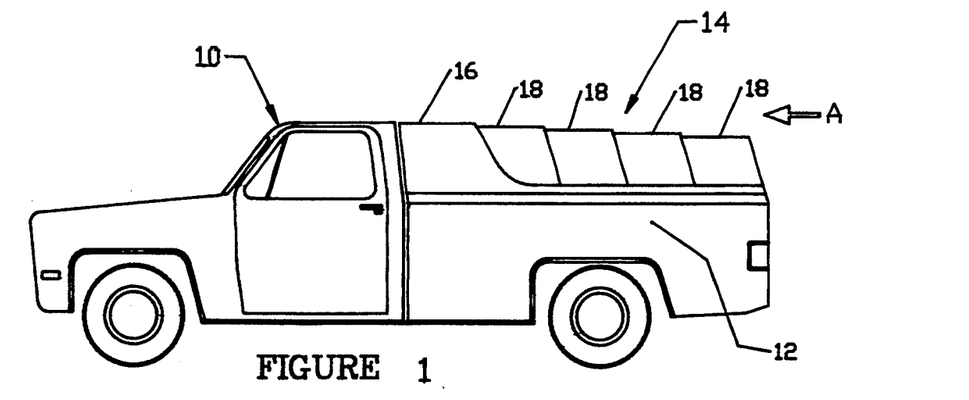
FIG. 1 is a side view of a truck with a telescopic roof structure in a closed condition.
Figure 2:
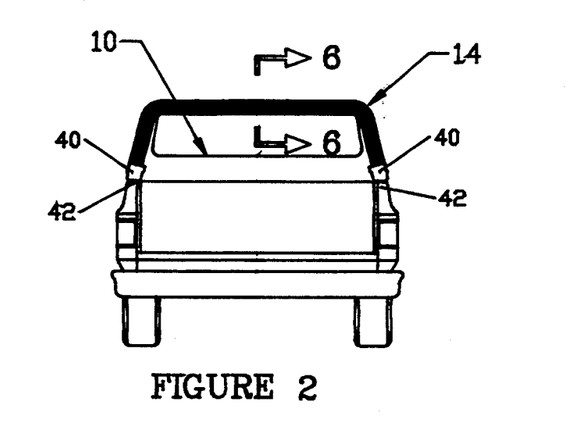
FIG. 2 is an end view in the direction of arrow A in FIG. 1.
Figure 3:
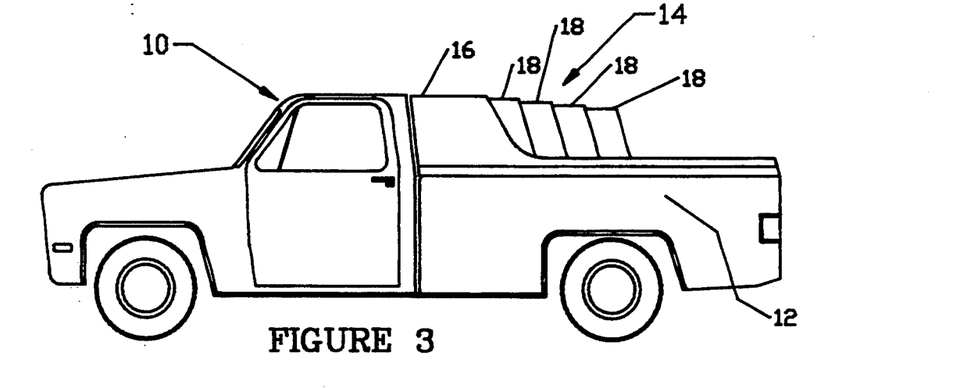
FIG. 3 is a side view with the roof structure partially open.
Figure 4:
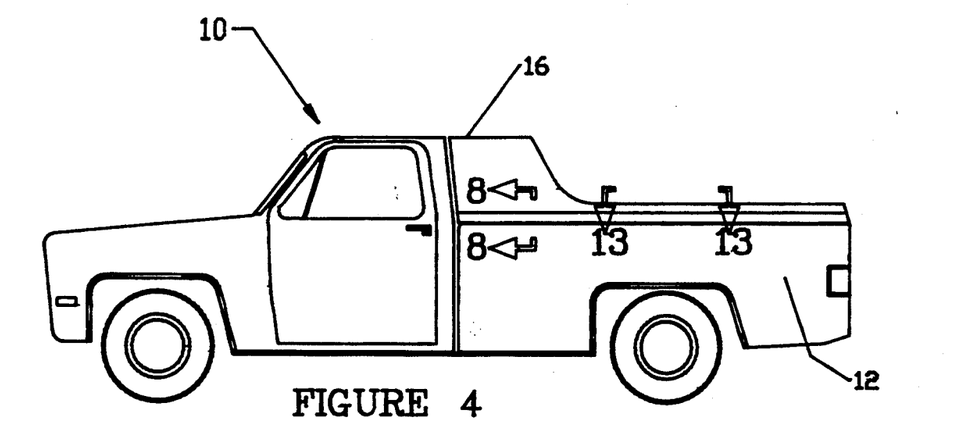
FIG. 4 is a side view with the roof structure fully open.

FIG. 1 shows the roof structure extended, to cover the load carrying portion 12, this being referred to, for convenience, as the closed condition. In FIG. 3 the roof structure is shown approximately half open and in FIG. 4 the roof structure is fully open. The roof structure is seen in cross-section profile in FIG. 2.

Figure 5:
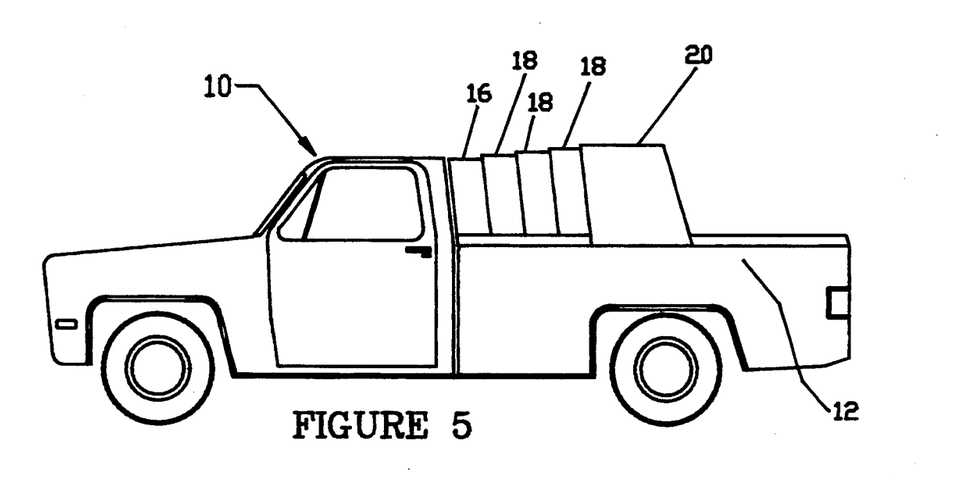
FIG. 5 is a side view of a truck, similar to FIG. 1, but with an alternative arrangement of sections.

FIG. 5 illustrates an alternative arrangement in which the largest cross-sectional section 20 is at the rear end of the load carrying portion 12 when in the closed condition, with the telescopic sections 18 extending to the front of the load carrying portion. As the roof opens, the largest section 20 moves forward, each section successively overlapping the next section. In FIG. 5 the roof structure is approximately half open.

Figure 6:
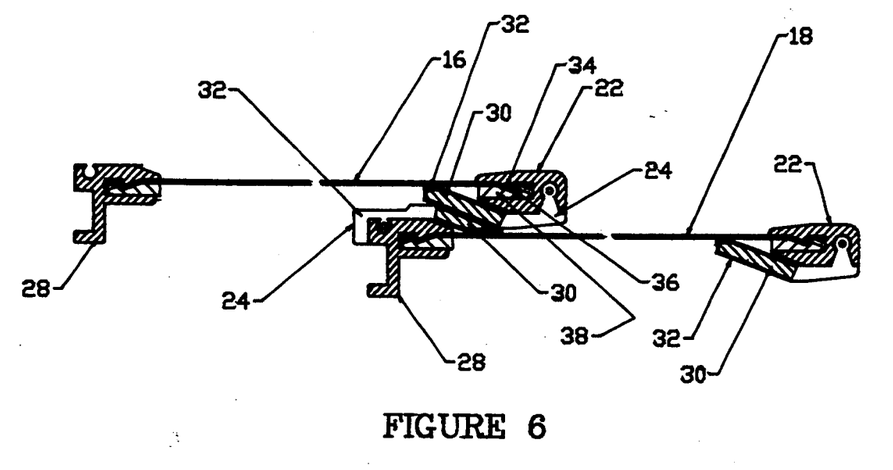
FIG. 6 is a cross-section on the line 6—6 of FIG. 2, illustrating sealing members between sections, the sections extended to the closed condition.
Figure 7:
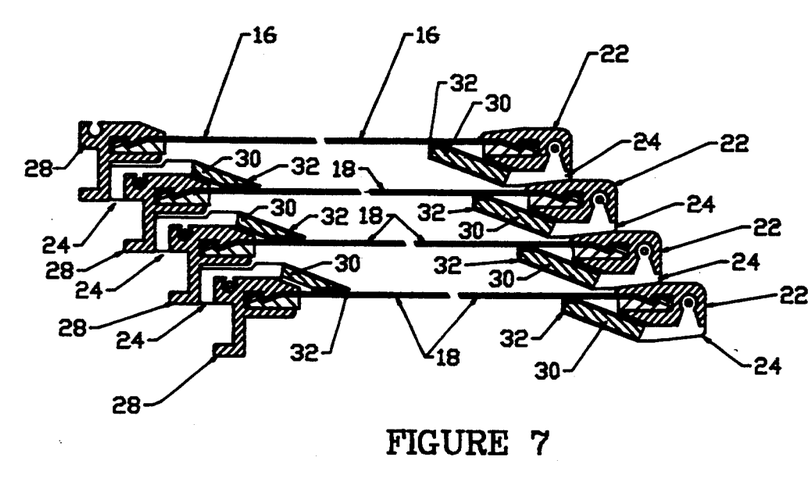
FIG. 7 is a cross-section illustrating the sealing members as in FIG. 6, with the sections telescoped to an open position.

The sections 16 and 18, and also 20 and 18, are preferably sealed on the top surfaces and down the side surfaces to prevent ingress of water, dust and other undesirable matter. As illustrated in FIGS. 6 and 7, each section has a peripherally extending flange 22 at a rearward or outer end. Each flange, in the example illustrated, is an extruded or otherwise formed member which clips on to the edge of the related section. The flange has a rib 34 which engages in a groove 36 in the section, a length of splice material 38 being inserted to hold the flange assembled to the section. Attached to each flange 22 is a seal member 24. On each section 18, at what can be considered to be the inner or forward end, a further peripherally extending seal member 24 is attached. These seal members slide within the next larger section and in the fully closed condition, as illustrated in FIG. 6, seal against the related flange 22. For stiffness and rigidity, peripheral flanges 28 are provided at the forward or inner ends of the sections 16 and 18, attached in a similar manner to flanges 22. FIG. 7 illustrates the roof structure fully open.

Each seal member 24, in the example illustrated, includes a central flexible portion 30 and a flexible outer tubular member 32. At least the tubular member 32 can be made of a low friction material and the inner portion can have magnetic properties. In the fully open position, as illustrated in FIG. 6, the enclosed portions 30/32 of the seals abut.

FIGS. 8, 9, 10 and 11 illustrate the invention, in one form, and in particular, as an example, as applied to the mounting and support of the lower side edges of roof sections 16 and 18, of the embodiment of FIGS. 1 to 4. The arrangement for the embodiment of FIG. 5 is similar except that the outer section 20 will be mounted for sliding, and with the innermost section 16 not sliding.

Figure 8:
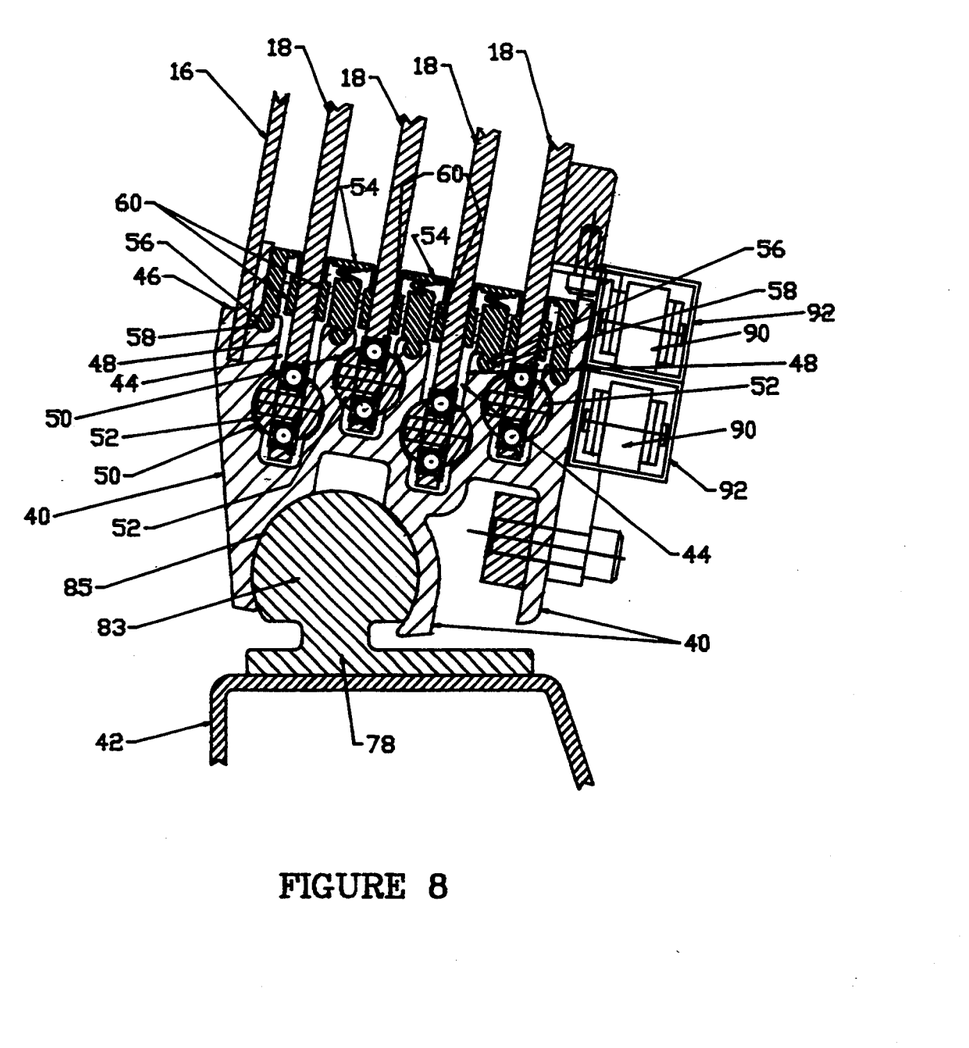
FIG. 8 is a cross-section on the line 8—8 of FIG. 4, illustrating one form of roller and track arrangement in accordance with the present invention.

As illustrated in FIG. 8, a track 40 is mounted on the top edge 42 of the side of the truck. A track is provided at each side, as seen in FIG. 2. The bottom edges of the side walls of the outer section 16 are mounted on the outer sides of the tracks. These edges would normally be attached to the tracks by some convenient means, for example, screws, welding or other.

A plurality of main slots 44 extend down from the top surface 46 of the track 40, each slot having a parallel portion 48 and an enlarged circular cross-section portion 50 at a distance from the surface 46. To provide room for the enlarged portions 50, they are staggered in their distance from the surface 46, as seen in FIG. 8.

The lower edges of the side walls of the section 18 extend into the slots 44, as support members, and carry at their inner edges rollers 52. These will be described later in conjunction with FIGS. 9 and 10, together with a more detailed description of the enlarged portions 50.

On each side of the side walls of the sections 18 is a seal member 54. Each seal member has a rib 56 retained in a subsidiary slot 58 and either one or two side flanges 60, depending upon the position. These will be described later, with the sealing action, in conjunction with FIG. 12 and FIGS. 14a and 14b.

Figure 9:
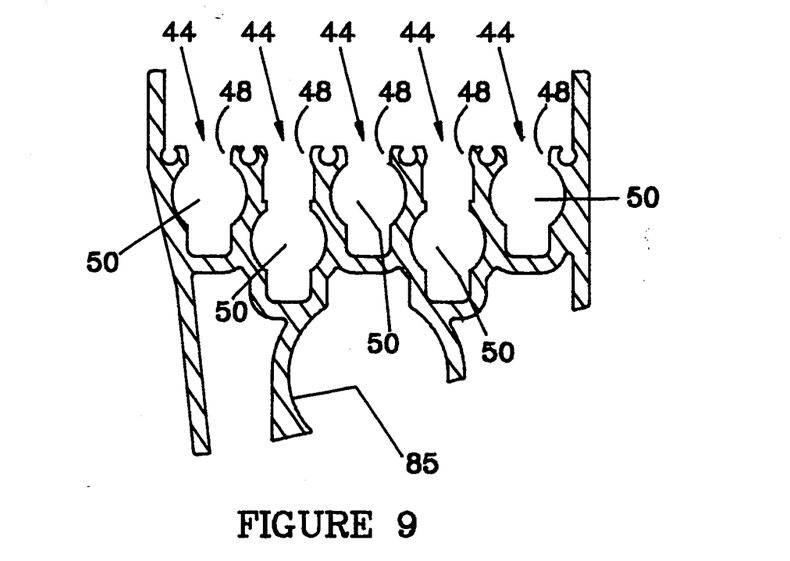
FIG. 9 is a cross-section, similar to that of FIG. 8 of one form of track only, the roller and side wall assemblies omitted.

FIG. 9 illustrates, in cross-section, a form of track 40, very similar to the track 40 in FIG. 8, illustrating the slots 44, with portions 50, more clearly.

Figure 10:
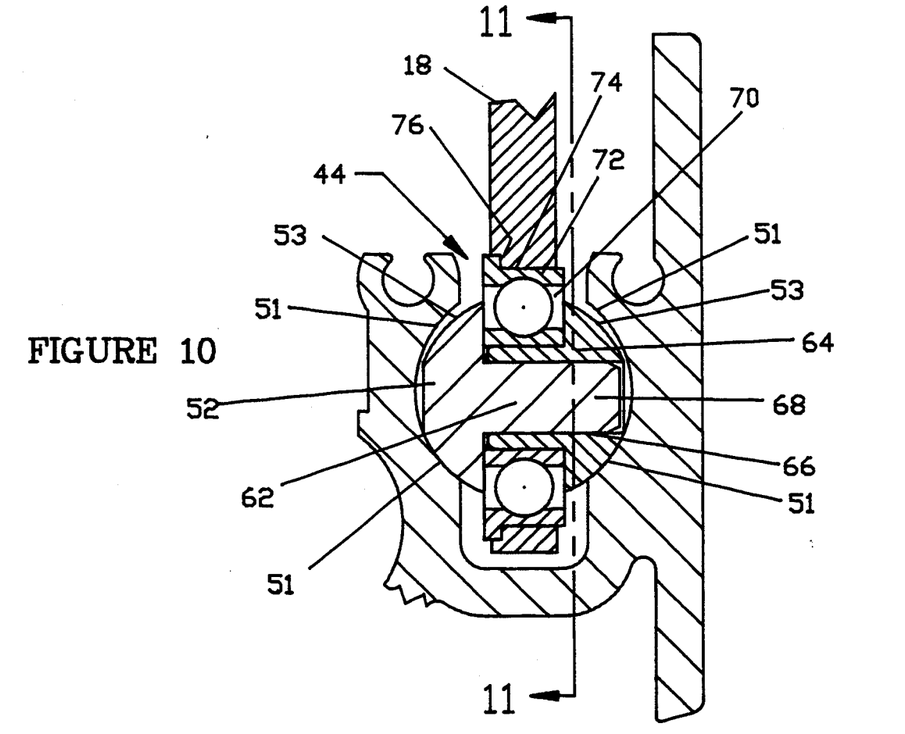
FIG. 10 illustrates one roller assembly and the associated part of the track, as in FIG. 8, to a larger scale.

A roller 52, and related enlarged portion 50 of a slot 44, is seen in larger scale in FIG. 10. Each roller 52 comprises spaced members 62 and 64, member 64 having an axial bore 66 into which fits a central spigot 68 on the member 62. The spigot 68 is a force fit into the bore 66. The members 62 and 64 form a seating for a ball bearing 70, the outer race 72 of which is a force fit in a bore 74 in a side wall of a section 18. A shoulder 76, or a snap ting or other structure, on the outer race 72, locates the ball bearing in the side wall, and this in turn locates the side wall in the slot 44.

In the embodiment of FIGS. 8, 9 and 10, the enlarged portions 50 are circular in overall cross-section, that is the beating surfaces 51 are parts of a common circle. To ensure that line contact occurs between rollers and portions 50, the contact surfaces 53 of the rollers must have the same radius as the surfaces 51. At the same time, to permit free rolling of the rollers in the portions 50, the rollers must be slightly smaller at a vertical diameter, as seen in FIG. 10, than the portions 50. That is, the diameter of each roller in a plane normal to its rotational axis, and coincident with the longitudinal axis of the track, is slightly smaller than the diameter of the portion 50. This is illustrated in FIG. 10.

Thus, as viewed sideways, normal to its rotational axis, as illustrated in FIG. 10, the contact surfaces 53 of a roller have the same radius of curvature as the radius of curvature of the beating surfaces 51 of the enlarged portion 50. Also, viewed from one end, that is along the rotational axis the maximum diameter of a roller is slightly smaller than the diameter of the enlarged portion 50.

The provision of spherical portions 50 has an advantage that a certain degree of "tilting" or similar movement of a wall can be accommodated by rotation of rollers in the portions 50, about axes extending along the track.

Figure 11:
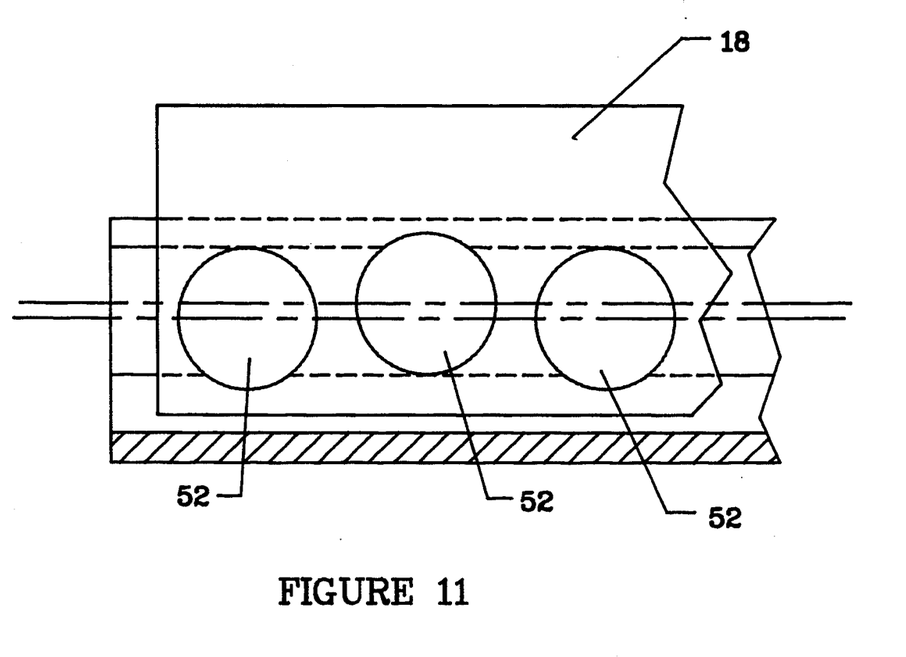
FIG. 11 is a side view of part of the length of a track with roller assemblies, substantially on the line 11—11 of FIG. 10.

The portions 50 extend the length of the track and normally each side wall covers a plurality of rollers 52 spaced apart along the track. To provide against vertical movement of a roller in a track, as by a lifting action of a side wall, the rollers can be alternately displaced up and down relative to a central axis. Such displacement will also act to prevent or at least considerably reduce twisting of a side wall. This is particularly so for roof structures, for example, as in FIGS. 1 to 5, where it is possible to slide roof sections by pushing only on one side, twisting or other movement or distortion being prevented by the vertical displacement of the rollers. Yet some rotation of rollers about axes along the track can still occur. This provides very easy movement without a tendency to jam. This displacement is illustrated in FIG. 11. By this means the rollers alternatively contact the top and bottom surfaces of the portions 50.

Figure 12:
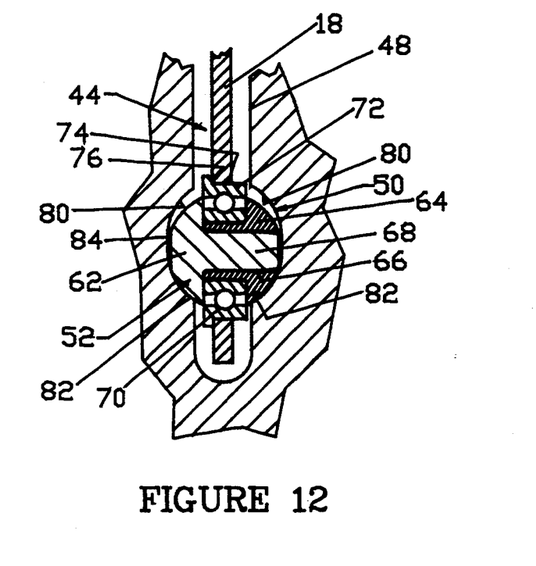
FIG. 12 illustrates a modification of the track form from that illustrated in FIG. 10.

To provide rigidity in the mounting of a section, for example for a suspended door, or some other structure, the enlarged portions can comprise two semi-circular cross-section channels having spaced arcuate bearing surfaces 80 and 82, joined by a short parallel section 84 as illustrated in FIG. 12. The rollers can be of spherical form, or as illustrated in FIG. 10, and an up and down displacement, as in FIG. 11, provides for the rollers being alternately in the upper and lower channels. This gives considerable rigidity and prevents any tendency for the sections to rotate within the tracks.

Some degree of alignment variation can be provided between the track and the member on which it is mounted. One way of obtaining this is illustrated in FIG. 8. A mounting rail 78 extends along each side wall 42, having a part cylindrical cross section rib 83 extending upward. A cooperative part cylindrical recess 85 on the bottom of the track 40 fits on the rib 83. If no mounting flexibility is required, then the rails can be attached directly to the truck sides, for example by flanges.

Figure 13:
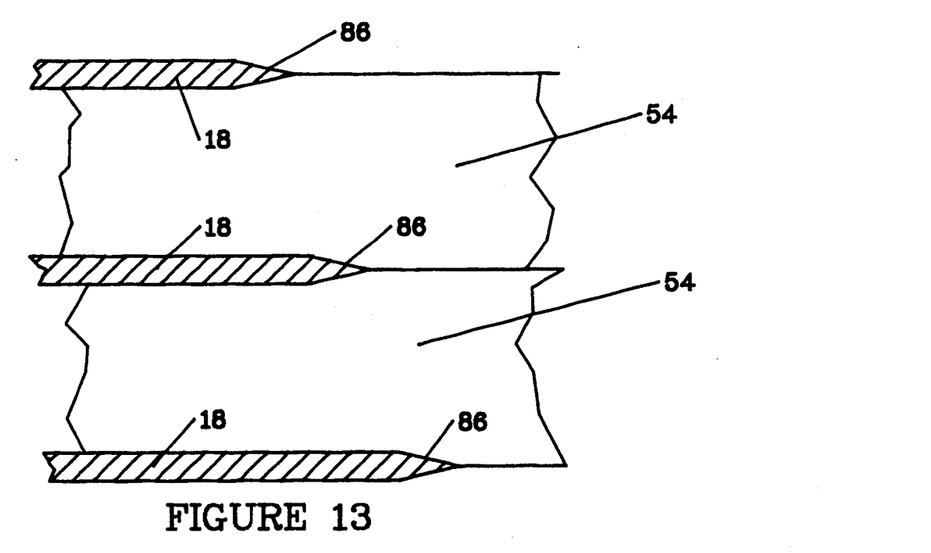
FIG. 13 is a cross-section on the line 13—13 of FIG. 4.

FIG. 13 illustrates how the seal members 54 are separated by the side walls of the sections 18. The side walls are given tapered front edges 86, both to assist in separating the seal members as the sections slide and also prevent the forming of gaps at the front edges. As illustrated in FIG. 13, the sections 18 have all been moved to some extent from the fully open condition.

Figure 14A:
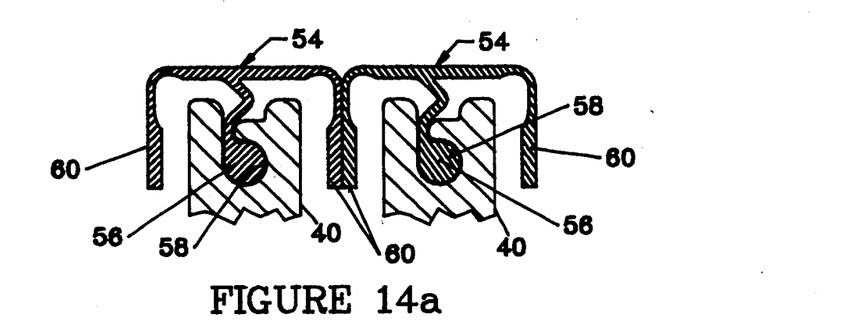
FIGS. 14a and 14b are cross-sections illustrating the sealing between sections side walls, at the track edge.
Figure 14B:
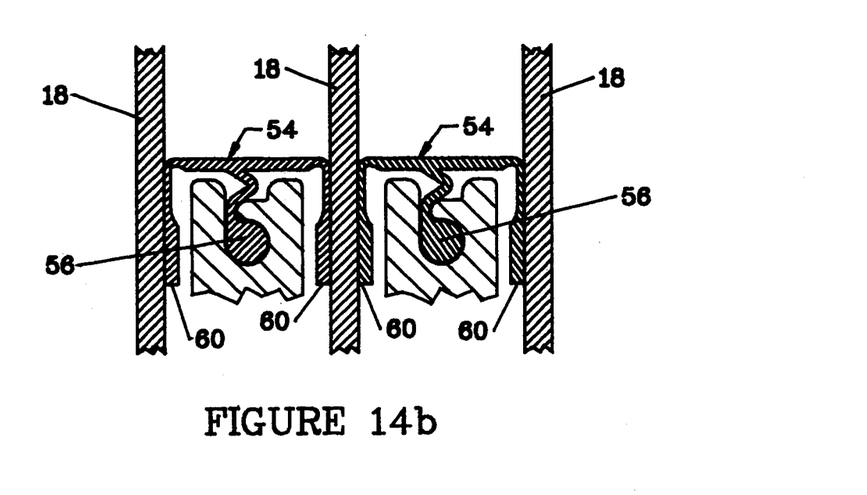

The action of the seal members 54 is seen in FIGS. 14a and 14b. In FIG. 14a, the seal members are expanded to contact each other at their side flanges 60. As the side walls of the sections 18 move, the side flanges are separated, the seal members bending at their corners. The side flanges now contact each surface of a side wall of a roof section, as in FIG. 14b.

The seal members 54, as well as the seal members 24, are preferably magnetic. They can be extruded synthetic material which contains magnetized material. By this means the seal members are attracted to the surfaces they seal against and give an effective seal.

FIG. 8 also illustrates a possible modification to a roof structure. The sections of a roof are relatively easy to move manually, but if desired, powered movement of the sections can be provided. In FIG. 8, a roller chain 90 is shown connected to the lower edge of a side wall of a section 18. Both side walls of front opening sections 18 would have chains, preferably. The chains would pass round toothed wheels at, for example, the forward end of each track, rotated by an electrical motor. The chain is housed in tubes 92 mounted on the preferably inner side of the track 40.

Normally the section 18 farthest from the fixed section 16 would be drawn by the chains 90, the sections being successively moved as the seal members contacted either flanges 22, when moving to a closed condition, or flanges 28 when moving to an open conditions.

The actual form and relative dimensions and proportions of the track, and of the roller assemblies, can vary. Particularly the method of manufacture of the track will affect dimensions and proportions, for ease of manufacture. The track can be extruded, of metal, and this can affect dimensions and proportions. As an alternative the track can be assembled from a number of separate pieces individually formed, extruded or machined or other, and then fastened together for example by bolts, rivets, welding or other means.

Similarly the form and relative dimensions of the seals can vary. For example the seals 54, attached to the track 40 may extend further from the surface of the track.

While the roller and track arrangement has been illustrated and described with the track at the bottom and the roller support members extending up from the track, the invention is also applicable to the support and guidance of members extending downwards from the track. Also, while the rollers are shown in an inclined arrangement in FIG. 8, they can have a vertical arrangement or be at varying angles, as may be desired. Also, while four roller assemblies have been shown in FIG. 8, for four sliding members, the number of such assemblies can vary. Thus for one sliding member only one roller assembly and one slot would be required. For double doors for example, two roller assemblies and two slots would be required. Depending upon requirements, so the number of roller assemblies and slots will vary. A roller assembly may comprise three rollers or more. Rollers may extend the full width of a member, or only at each side, with an associated support member.

What is claimed is:

1. A roller and track apparatus for sliding members, comprising:
   an elongate track, having an outer surface;
   at least one slot extending into said track from said outer surface and extending along said track, said slot including a first portion extending from said outer surface and an enlarged portion adjacent an inner end of said slot;
   at least one support member extending into said slot;
   a plurality of rollers on said support member positioned in said enlarged portion, said rollers spaced apart along the track, said rollers mounted on said support member to alternately contact diametrically opposed bearing surfaces in said enlarged portion.

2. Apparatus as claimed in claim 1, said support member extending in a plane along said slot.

3. Apparatus as claimed in claim 2, said rollers offset from a longitudinal axis extending along said enlarged portion, said rollers offset in said plane.

4. Apparatus as claimed in claim 2, said enlarged portion comprising spaced apart bearing surfaces connected by a parallel section.

5. Apparatus as claimed in claim 4, said bearing surfaces spaced apart in said plane.

6. Apparatus as claimed in claim 1, said plurality of rollers comprising at least three rollers.

7. Apparatus as claimed in claim 1, said enlarged portion having a circular cross-section, said bearing surfaces parts of a common circle.

8. Apparatus as claimed in claim 7, each said roller having a bearing surface, viewed normal to a rotational axis, of the same curvature as said bearing surfaces of said enlarged portion, and also having a diameter, viewed normal to said rotational axis, smaller than the diameter of said circular cross-section.

9. Apparatus as claimed in claim 1, each of said rollers including a bearing mounted thereon, and an aperture in each said support member, said bearings mounted in said apertures.

10. Apparatus as claimed in claim 1, including seal members extending along said outer surface of said track either side of said slot, said seal members in an undisplaced condition contacting each other to seal said slot, said seal members displaced laterally by passage of said support member in said slot, said seal support members contacting said support member.

11. Apparatus as claimed in claim 10, said support member comprising a magnetic material and said seal members including magnetic material.

12. Apparatus as claimed in claim 1, including a plurality of slots extending parallel to and spaced from each other, and a support member extending through each slot.

13. Apparatus as claimed in claim 12, said enlarged portions successively closer to and farther from said outer surface, to give a staggered positional relationship.

14. Apparatus as claimed in claim 12, said support members connected to a plurality of sliding members, slideable in an overlapping relationship.

15. Apparatus as claimed in claim 12, including a further elongated track extending parallel to and spaced from said elongate track, a plurality of slots extending parallel to and spaced from each other in said further elongate track, and a support member extending through each slot, said support members in said elongate track and said support members in said further elongate track forming associated pairs.

16. Apparatus as claimed in claim 15, including means connecting said support members of each said associated pair.

17. Apparatus as claimed in claim 12, including means for sliding said support members.

18. Apparatus as claimed in claim 17, said means comprising a roller chain mounted on said track, said roller chain connected to said support members.

19. A structure as claimed in claim 12, including seal members extending along said outer surface of said track, either side of each slot, said seal members in an undisplaced condition contacting each other to seal said slot, said seal members displaced laterally by passage of said support members in said slots, said seal members contacting said support members.

* * * * *